US012603710B2

(12) United States Patent
Lähteenmäki

(10) Patent No.: US 12,603,710 B2
(45) Date of Patent: Apr. 14, 2026

(54) OPTICAL DRIVE FOR QUBITS

(71) Applicant: IQM FINLAND OY, Espoo (FI)

(72) Inventor: Pasi Lähteenmäki, Espoo (FI)

(73) Assignee: IQM FINLAND OY, Espoo (FI)

( * ) Notice: Subject to any disclaimer, the term of this patent is extended or adjusted under 35 U.S.C. 154(b) by 242 days.

(21) Appl. No.: 18/288,139

(22) PCT Filed: Apr. 28, 2021

(86) PCT No.: PCT/FI2021/050317
§ 371 (c)(1),
(2) Date: Oct. 24, 2023

(87) PCT Pub. No.: WO2022/229492
PCT Pub. Date: Nov. 3, 2022

(65) Prior Publication Data
US 2024/0204885 A1      Jun. 20, 2024

(51) Int. Cl.
*H04B 10/70*          (2013.01)
*G06N 10/40*          (2022.01)
*H04B 10/2575*        (2013.01)

(52) U.S. Cl.
CPC ............. *H04B 10/70* (2013.01); *G06N 10/40* (2022.01); *H04B 10/2575* (2013.01)

(58) Field of Classification Search
CPC .................................................... H04B 10/70
See application file for complete search history.

(56) References Cited

U.S. PATENT DOCUMENTS

| | | | |
|---|---|---|---|
| 2018/0062761 A1 | 3/2018 | Wade et al. | |
| 2019/0007051 A1* | 1/2019 | Sete ..................... | H03K 19/195 |
| 2019/0027800 A1* | 1/2019 | El Bouayadi ............ | H01P 3/08 |
| 2019/0181325 A1* | 6/2019 | Hertzberg .............. | H10N 60/01 |
| 2020/0412457 A1* | 12/2020 | Bronn ..................... | H04B 10/70 |
| 2021/0350270 A1* | 11/2021 | Jones ........................ | G06F 1/20 |
| 2022/0222567 A1* | 7/2022 | Reagor .................. | G06N 10/40 |

FOREIGN PATENT DOCUMENTS

| | | |
|---|---|---|
| NL | 2016081 B1 | 7/2017 |
| WO | 2020154745 A1 | 7/2020 |
| WO | 2020260251 A1 | 12/2020 |

OTHER PUBLICATIONS

Lecocq, F., Quinlan, F., Cicak, K. et al. Control and readout of a superconducting qubit using a photonic link. Nature 591, 575-579 (2021). https://doi.org/10.1038/s41586-021-03268-x. (Year: 2021).*
Notification of reasons for refusal in connection to JP Application No. 2023-56666, dated Jan. 21, 2025.

(Continued)

*Primary Examiner* — Nathan M Cors
(74) *Attorney, Agent, or Firm* — Meunier Carlin & Curfman LLC

(57)          ABSTRACT

Example embodiments relate to delivery of qubit drive signals to a cryogenic environment of a quantum computer. Qubit drive signal(s) may be conveyed to the cryogenic environment as optical signal(s). The optical signal(s) may be transduced to radio frequency signal(s) at the cryogenic environment for driving qubit(s). Apparatuses and methods are disclosed.

18 Claims, 3 Drawing Sheets

(56) References Cited

OTHER PUBLICATIONS

Lecocq et al., Control and readout of a superconducting qubit using a photonic link, Nature, vol. 591, No. 7851, pp. 575-579, 2021.

Mckenna et al., Cryogenic microwave-to-optical conversion using a triply-resonant lithium niobate on sapphire transducer, Optica, pp. 1-15, 2020.

Forsch et al., Microwave-to-optics conversion using a mechanical oscillator in its quantum grounstate, Nature Phys., 19, 69-74, 2020.

Andrews et al., Bidirectional and efficient conversion between microwave and optical light, Nature Phys., 10, 321-326, 2014.

Mirhosseini et al., Superconducting qubit to optical photon transduction, Nature, 16 pages, 2020.

International Search Report and Written Opinion issued in PCT/FI2021/050317, mailed Jan. 28, 2022.

Lin et al., Electrically tunable-focusing and polarizer-free liquid crystal lenses for ophthalmic applications, Optics Express, vol. 21, No. 8, 2013, pp. 9428-9436.

\* cited by examiner

OPTICAL DRIVE FOR QUBITS

CROSS REFERENCE TO RELATED APPLICATIONS

The application is a U.S. National Stage application filed under 35 U.S.C. § 371 of PCT/FI2021/050317, filed on Apr. 28, 2021.

TECHNICAL FIELD

Example embodiments generally relate to the field of quantum computers. In particular, some example embodiments relate to delivery of qubit drive signals to a cryogenic environment of a quantum computer.

BACKGROUND

Quantum computing may involve processing information as qubits (quantum bits) stored in controllable and readable quantum mechanical states. Operations performed for qubits may involve driving the qubits with radio frequency (RF) signals. Quantum processing circuits may be operated at a cryogenic environment, which has a sufficiently low temperature. Qubit drive signals may be conveyed to the cryogenic environment from room temperature, which may result in electrical losses due to electrical dissipation and heating due to mechanical conduction. Therefore, quality of qubit drive signals may not be sufficient for all present or future applications.

SUMMARY

It is an objective to improve quality of qubit driving signals in quantum computers. This and further benefits may be achieved by the features of the independent claims. Further advantageous implementation forms are provided in the dependent claims, the description, and the drawings.

According a first aspect there is provided an apparatus. The apparatus may comprise means for conveying at least one optical signal to a cryogenic environment of a quantum computer; means for transducing the at least one optical signal to at least one radio frequency signal at the cryogenic environment of the quantum computer; and means for driving at least one qubit of the quantum computer based on the at least one radio frequency signal.

According to an embodiment of the first aspect, the apparatus may further comprise means for transducing the at least one optical signal to the at least one radio frequency signal by at least one optomechanical transducer at the cryogenic environment of the quantum computer.

According to an embodiment of the first aspect, the apparatus may further comprise means for modulating the at least one optical signal with at least one input radio frequency signal at a non-cryogenic environment of the quantum computer.

According to an embodiment of the first aspect, the apparatus may further comprise means for modulating the at least one optical signal with the at least one input radio frequency signal by at least one electro-optic modulator.

According to an embodiment of the first aspect, the apparatus may further comprise at least one optical isolator at the non-cryogenic environment of the quantum computer, wherein the at least one optical isolator is located optically between the at least one electro-optic modulator and the at least one optomechanical transducer, and wherein the at least one optical isolator is configured to dissipate energy received from the cryogenic environment.

According to an embodiment of the first aspect, the at least one radio frequency signal and/or the at least one input radio frequency signal may comprise at least one microwave signal.

According to an embodiment of the first aspect, the apparatus may further comprise means for conveying a plurality of optical signals to the cryogenic environment of the quantum computer; means for transducing the plurality of optical signals to a plurality of radio frequency signals at the cryogenic environment of the quantum computer; and means for driving a plurality of qubits based on the plurality of radio frequency signals.

According to an embodiment of the first aspect, the apparatus may further comprise means for modulating the plurality of optical signals with a plurality of input radio frequency signals at the non-cryogenic environment of the quantum computer.

According to an embodiment of the first aspect, the apparatus may further comprise a multiplexer configured to multiplex the plurality of optical signals to an optical fiber configured to convey the plurality of optical signals to the cryogenic environment of the quantum computer.

According to an embodiment of the first aspect, the apparatus may further comprise a demultiplexer configured to demultiplex the plurality of optical signals from the optical fiber at the cryogenic environment of the quantum computer.

According to an embodiment of the first aspect, the multiplexer may comprise a wavelength division multiplexer. The demultiplexer may comprise a wavelength division demultiplexer.

According to an embodiment of the first aspect, the apparatus may further comprise a plurality of optical isolators at the non-cryogenic environment of the quantum computer. The plurality of optical isolators may be located optically between the multiplexer and respective electro-optic modulators. The plurality of optical isolators may be configured to dissipate energy received from the cryogenic environment via the optical fiber.

According to a second aspect there is provided an apparatus. The apparatus may comprise at least one optical fiber configured to convey at least one optical signal to a cryogenic environment of a quantum computer; at least one optomechanical transducer configured to transduce the at least one optical signal to at least one radio frequency signal at the cryogenic environment of the quantum computer; and driving circuitry configured to drive the at least one qubit based on the at least one first radio frequency signal.

According to an embodiment of the second aspect, the apparatus may further comprise: at least one electro-optic modulator configured to modulate the at least one optical signal with at least one input radio frequency signal at a non-cryogenic environment of the quantum computer.

According to an embodiment of the second aspect, the apparatus may further comprise: at least one optical isolator at the non-cryogenic environment of the quantum computer. The at least one optical isolator may be located optically between the at least one electro-optic modulator and the at least one optomechanical transducer. The at least one optical isolator may be configured to dissipate energy received from the cryogenic environment via the optical fiber.

According to an embodiment of the second aspect, the at least one radio frequency signal and/or the at least one input radio frequency signal may comprise at least one microwave signal.

According to an embodiment of the second aspect, the optical fiber may be configured to convey a plurality of optical signals to the cryogenic environment of the quantum computer, and the apparatus may further comprise: a plurality of optomechanical transducers configured to transduce the plurality of optical signals to a plurality of radio frequency signals at the cryogenic environment of the quantum computer. The driving circuitry may be configured to drive a plurality of qubits based on the plurality of radio frequency signals.

According to an embodiment of the second aspect, the apparatus may further comprise a plurality of electro-optic modulators configured to modulate the plurality of optical signals with a plurality of input radio frequency signals at the non-cryogenic environment of the quantum computer.

According to an embodiment of the second aspect, the apparatus may further comprise a multiplexer configured to multiplex the plurality of optical signals to the optical fiber.

According to an embodiment of the second aspect, the apparatus may further comprise a demultiplexer configured to demultiplex the plurality of optical signals from the optical fiber at the cryogenic environment of the quantum computer.

According to an embodiment of the second aspect, the multiplexer may comprise a wavelength division multiplexer. The demultiplexer may comprise a wavelength division demultiplexer.

According to an embodiment of the second aspect, the apparatus may further comprise a plurality of optical isolators at the non-cryogenic environment of the quantum computer. The plurality of optical isolators may be located optically between the multiplexer and respective electro-optic modulators. The plurality of optical isolators may be configured to dissipate energy received from the cryogenic environment via the optical fiber.

According to a third aspect there is provided a method. The method may comprise conveying at least one optical signal to a cryogenic environment of a quantum computer; transducing the at least one optical signal to at least one radio frequency signal at the cryogenic environment of the quantum computer; and driving the at least one qubit based on the at least one radio frequency signal.

According to an embodiment of the third aspect, the method may further comprise: transducing the at least one optical signal to the at least one radio frequency signal by at least one optomechanical transducer at the cryogenic environment of the quantum computer.

According to an embodiment of the third aspect, the method may further comprise: modulating the at least one optical signal with at least one input radio frequency signal at a non-cryogenic environment of the quantum computer.

According to an embodiment of the third aspect, the method may further comprise modulating the at least one optical signal with the at least one input radio frequency signal by at least one electro-optic modulator.

According to an embodiment of the third aspect, the method may further comprise providing at least one optical isolator at the non-cryogenic environment of the quantum computer, wherein the at least one optical isolator is provided optically between the at least one electro-optic modulator and the at least one optomechanical transducer for dissipating energy received from the cryogenic environment.

According to an embodiment of the third aspect, the at least one radio frequency signal and/or the at least one input radio frequency signal may comprise at least one microwave signal.

According to an embodiment of the third aspect, the method may further comprise conveying a plurality of optical signals to the cryogenic environment of the quantum computer; transducing the plurality of optical signals to a plurality of radio frequency signals at the cryogenic environment of the quantum computer; and driving a plurality of qubits based on the plurality of radio frequency signals.

According to an embodiment of the third aspect, the method may further comprise: modulating the plurality of optical signals with a plurality of input radio frequency signals at the non-cryogenic environment of the quantum computer.

According to an embodiment of the third aspect, the method may further comprise: multiplexing, by a multiplexer, the plurality of optical signals to an optical fiber configured to convey the plurality of optical signals to the cryogenic environment of the quantum computer.

According to an embodiment of the third aspect, the method may further comprise demultiplexing, by a demultiplexer, the plurality of optical signals from the optical fiber at the cryogenic environment of the quantum computer.

According to an embodiment of the third aspect, the multiplexer may comprise a wavelength division multiplexer. The demultiplexer may comprise a wavelength division demultiplexer.

According to an embodiment of the third aspect, the method may further comprise providing a plurality of optical isolators at the non-cryogenic environment of the quantum computer. The plurality of optical isolators may be provided optically between the multiplexer and respective electro-optic modulators for dissipating energy received from the cryogenic environment via the optical fiber.

Any embodiment may be combined with one or more other embodiments. Many of the attendant features will be more readily appreciated as they become better understood by reference to the following detailed description considered in connection with the accompanying drawings.

BRIEF DESCRIPTION OF THE DRAWINGS

The accompanying drawings, which are included to provide a further understanding of the example embodiments and constitute a part of this specification, illustrate the example embodiments and together with the description help to explain principles of the example embodiments.

IN THE DRAWINGS

Figure 1:
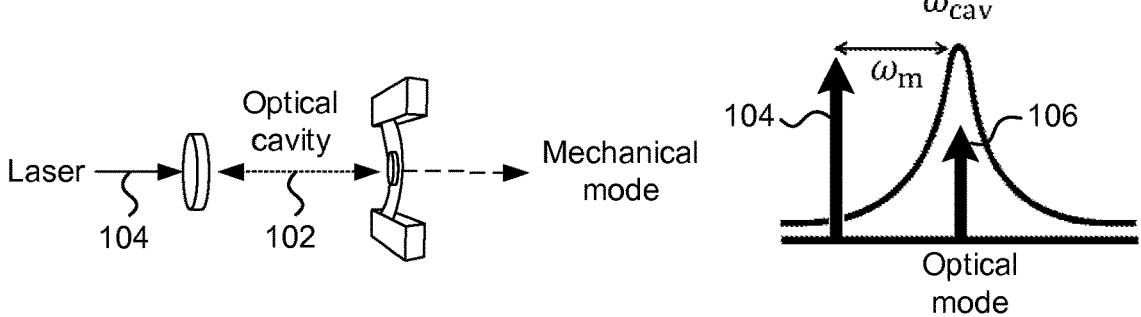
Figure 2:
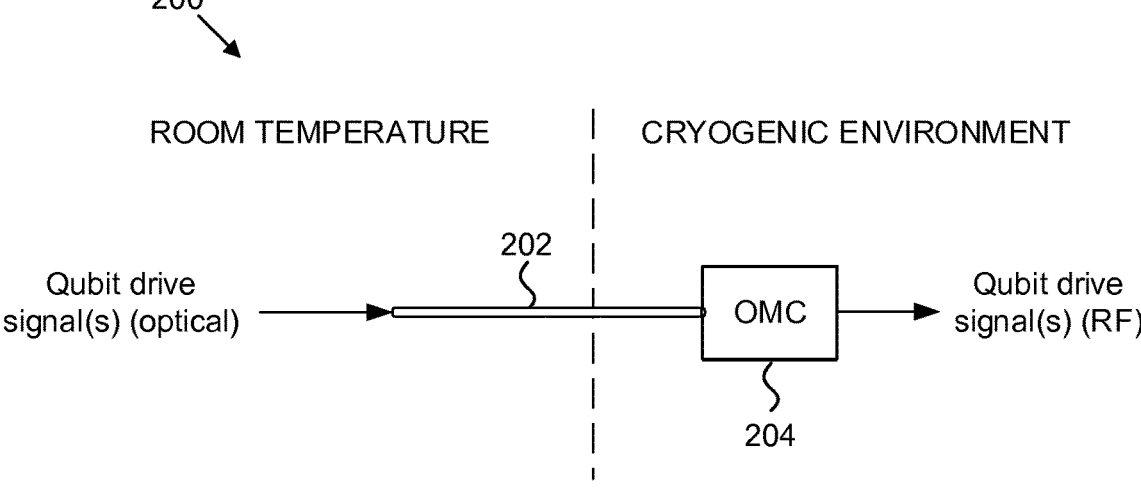
Figure 3:
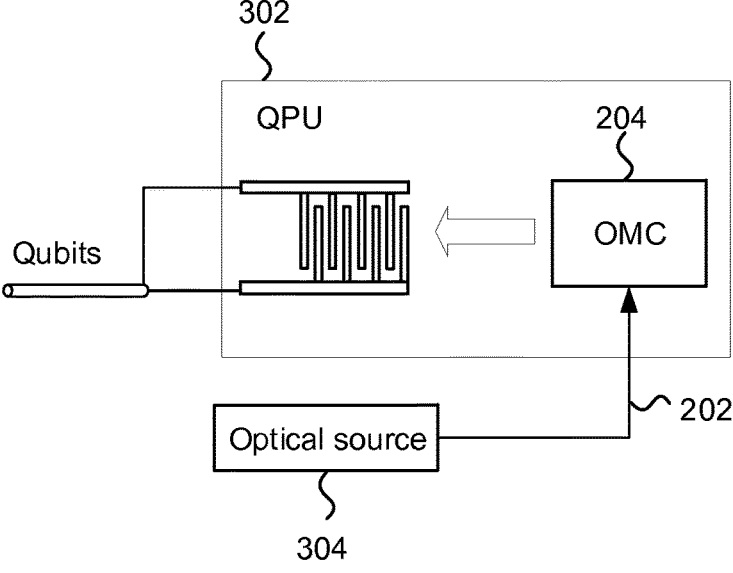
Figure 4:
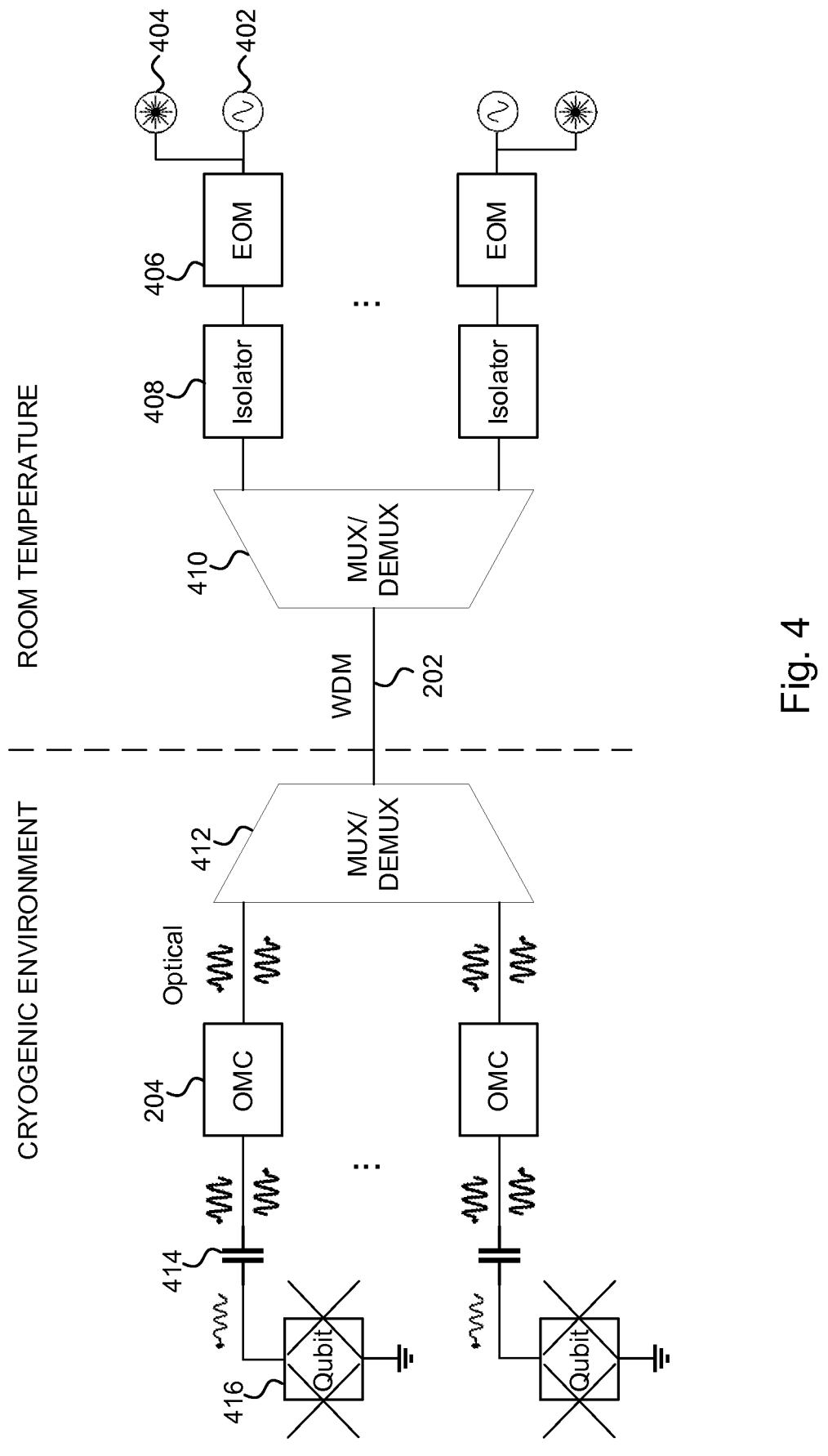
Figure 5:
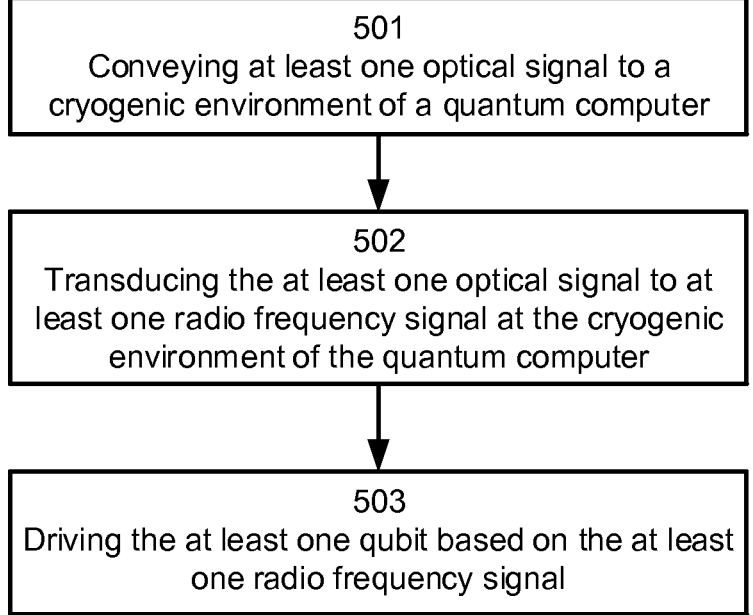

FIG. 1 illustrates an example of an optomechanical system;

FIG. 2 illustrates an example of an apparatus for delivering qubit drive signals to a cryogenic environment of a quantum computer;

FIG. 3 illustrates an example of a quantum processing circuit with an integrated optomechanical transducer;

FIG. 4 illustrates an example of an apparatus for multiplexing qubit drive signals to an optical fiber for delivery to a cryogenic environment of a quantum computer; and FIG. 5 illustrates an example of a method for driving qubits.

Like references are used to designate like parts in the accompanying drawings.

DETAILED DESCRIPTION

Quantum processing circuits may be operated at a cryogenic environment (e.g. a cryostat) at an extremely low temperature at and therefore it may be generally desirable to minimize the influence of thermal noise in order to maintain quality of qubit operations. The cryogenic environment may be generated for example by a dilution refrigerator, where different isotopes of Helium ($^3$He/$^4$He) are provided a mixing chamber of the dilution refrigerator to cryogenically cool the environment of the mixing chamber to cryogenic temperatures, for example in the order of a few millikelvins (mK). Qubit driving may comprise providing input or control signals to quantum logic gates of a quantum processing circuit, or in general to facilitate gates, be they single-qubit, two-qubit, or multi-qubit gates.

Qubit drive signals and qubit read-out signals may be delivered between the cryogenic and room temperature environments, for example to enable remote entanglement of qubits in distributed quantum computing system, or for any other purpose. This poses a challenge on the accuracy of the quantum computing system, since the delivery of signals between the different thermal environments may cause excessive thermal noise to appear at the cryogenic environment.

Increasing the number of superconducting qubits stored in dilution refrigerators may further aggravate the issues associated with delivery of qubit drive signals. Qubit drive signals may be conveyed for example by coaxial cables with rigid metal body and a center conductor, which may be difficult to thermalize and which may conduct heat between higher temperature stages and the mixing chamber. Further, due to their length and even minor impedance mismatches, coaxial cables may also suffer from loss and irregularities in their frequency response. Crosstalk, interference, multiplexing and signal-to-noise ratio (SNR) related issues may also degrade performance. Room temperature thermal noise and equipment noise at radio frequencies may therefore need to be significantly attenuated to avoid driving thermal population into the qubits.

The example embodiments disclosed herein enable improving scalability of delivering qubit drive signals to a cryogenic environment of a quantum computer by mitigating associated dissipation issues. According to an embodiment, qubit drive signal(s) may be conveyed to the cryogenic environment as optical signal(s). The optical signal(s) may be transduced to radio frequency signal(s) at the cryogenic environment for driving qubit(s). The example embodiments enable lossless or near lossless power conversion and bidirectionality, which are examples of objectives of the example embodiments described herein. Furthermore, reduced dissipation and improved scaling may be achieved.

FIG. 1 illustrates an example of an optomechanical system, according to an embodiment. An optomechanical transducer may convert a radio frequency signal to acoustic, for example by means of the piezoelectric effect. The resulting acoustic energy may be further converted to an optical signal by direct mechanical modulation of an optical resonator. Optomechanical transducers may be beneficial for low temperature applications since they may not have any dissipative elements, thereby enabling theoretically lossless conversion. In the example of FIG. 1, the resonant frequency $\omega_{cav}$ of the optical cavity 102 may be modulated by mechanical motion induced by a radio frequency signal, for example through the piezoelectric effect mediated by surface acoustic waves (SAW). The optical cavity 102 may be pumped with a laser 104 at frequency $\omega_{cav}-\omega_m$. This may result in an optical sideband 106 to be generated at the resonant frequency $\omega_{cav}$ of the optical cavity 102.

Optomechanical transducers may be also operated in the reverse direction to transduce optical signals to RF signals.

Coherent optical-to-RF conversion may be performed for example based on a piezoelectric optomechanical crystal. An optomechanical transducer suitable for this purpose may for example comprise a one-dimensional optomechanical crystal, which may be mechanically coupled with an inter-digital transducer (IDT) through the surface acoustic waves. The optical-to-RF conversion may be also theoretically lossless and hence may not lead to any heating or excess noise. Optomechanical transducers may be therefore exploited in quantum computers to enable generation of modulated optical signals at room temperature, for example by modulating a laser, and feeding the optical signals by optical fiber(s) to the cryogenic environment and converting the optical pulses to a radio frequency signal by the optomechanical transducer in order to drive qubits, as will be further described below. It is noted that embodiments of the present disclosure may not be limited to a particular type of optomechanical transducer. In general, any suitable transducer configured to transduce optical signals to radio frequency signals, for example microwave signals, may be used. A microwave signal may have a frequency between 300 MHz and 300 GHz. A transducer may be bidirectional such that both optical-to-RF and RF-to-optical directions are supported.

FIG. 2 illustrates an example of an apparatus 200 for delivering qubit drive signals to a cryogenic environment of a quantum computer. Even though the apparatus 200 has been illustrated to comprise particular components, some of the components may not be present in every embodiment and the apparatus 200 may further comprise components not illustrated in FIG. 2. The apparatus 200 may comprise a quantum computer or a portion thereof, for example a module, a component, or a set of components configured to be applied at a quantum computer.

A first portion of the apparatus 200 may be located at room temperature. A second portion of the apparatus 200 may be located at a cryogenic environment at an extremely low temperature. As used herein, the terms (extremely) low temperature and cryogenic environment may relate to the required operating temperature of the electronic devices of a quantum processing circuit of a quantum computer. For example, these terms may relate to the critical temperature of the superconductor materials involved, or depend on the thermal energy scales as compared to the quantum energy scales of the quantum electronic components involved. It is however noted that the cryogenic environment may not be initially or permanently cooled to the low temperature. The cryogenic environment may therefore generally comprise a cryogenically coolable environment.

Signals may be delivered between the cryogenically cooled quantum processing circuit and room temperature environment. The designation "room temperature" should not be however taken as a limitation that would actually require the environmental conditions in the room temperature environment to correspond to those in rooms where people live and work in. It is more an indication that the conditions to the left in FIG. 2 do not require cryogenic cooling to the temperatures found in the cryogenic environment. Hence, the room temperature environment of FIG. 2 is provided as an example of a non-cryogenic environment.

As mentioned above, the environmental conditions in the cryogenic environment may involve an extremely low temperature, such as for example only a few kelvins, for example 4 K, or even less than one kelvin, for example in the order of millikelvins. The lowest temperature, which may be for example approximately 10 mK, may exist in only a part of the cryogenic environment, as there may be cooled stages of progressively lower temperatures. The qubits may be located for example at a mixing chamber (MXC) stage, which may be at the 10 mK temperature and be the coldest stage of the cryogenic environment. In general, temperature of this stage may be for example above 5 mK and below 100 mK. The optical components described herein may be provided at this stage. However, some fridges may also have nuclear magnetically cooled stage(s) that are even colder, and in some embodiments the optical components may be provided at such stage (s). In general, a dilution refrigerator may comprise several temperature stages, such as still, 4 K plate, cold plate, and others, which depending on the implementation may or may not house some or all of the components described herein. Saying that some part of the system is located within the cryogenic environment may not take position concerning at which of such stages that part is located. The environmental conditions in the cryogenic environment may also involve high vacuum, because a surrounding high vacuum may be used as thermal insulation for maintaining the low temperatures involved. Optical qubit drive signal(s) may be conveyed to the cryogenic environment of the quantum computer, for example by the optical fiber 202. The optomechanical transducer 204 may transduce the optical signal(s) to RF signal(s) at the cryogenic environment. The RF signal(s) may be then used for driving qubit(s) of the quantum computer. A qubit drive signal may cause a desired change in the quantum mechanical state of qubits. The qubit drive signal may be used for single-qubit gates, two-qubit gates, or multi-qubit gates. Two-qubits gates for example differ from single qubit gates in that they facilitate coupling of energy between single qubits and introduce entanglement, whereas single qubit gates may perform "rotations" or add or subtract from the phase or energy of the qubit. Generally speaking, as the quantum mechanical state of the quantum computer is described by a collective quantum mechanical wave function, it covers the state of all the qubits and any drive signal may impact the state of that collective wave function in a manner that may not be captured by looking at a single qubit alone.

FIG. 3 illustrates an example of a quantum processing circuit with an integrated optomechanical transducer. In this example, the quantum processing circuit 302 (chip) comprises the optomechanical transducer (OMC) 204 configured to transduce an optical signal received from an optical qubit drive source 304 to a RF signal. The quantum processing circuit 302 may be also called a quantum processing unit (QPU). The qubits may reside within the quantum processing circuit 302, or outside it, for example due to mechanical, thermal, or fabrication limit related reasons. The optical qubit drive source 304 may comprise for example an opto-electric modulator, as will be further described with reference to FIG. 4. It is however possible that the OMC 204 is not integrated within the quantum processing circuit 302. The OMC 204 may be for example provided as a separate component in the cryogenic environment, for example as a signal interface chip, which may be connected to the quantum processing circuit 302 for example using a printed circuit board (PCB). The quantum processing circuit 302 and/or the OMC 204 may be mounted to the mixing chamber of the dilution refrigerator of the quantum computer. The optical signal(s) may be therefore transduced to RF signal(s) at the dilution refrigerator of the quantum computer.

It may be desired to drive qubits with signals that are strong, but which mostly reflect back. If the reflected signal dissipates at the cryogenic environment, the temperature at the cryogenic environment may increase.

Therefore, using an optical fiber for delivering qubit drive signals from the room temperature to the cryogenically cooled quantum processing circuit 302 may provide a solution for fulfilling the requirements for low dissipation signal environment that can facilitate low-noise and high-dynamic-range drive signal environment for the qubits. For example, due to different quantum noise levels of optical and microwave signals, an optical signal may more easily propagate in room temperature without its quantum state being washed out by thermal noise. Additionally, long optical fibers may be also less lossy than long coaxial cables at the frequencies of interest. The loss itself, even if it were not associated with coupled thermal noise, may destroy the quantum state. Therefore, using optical signals for delivering qubit drive signals to the cryogenic environment may be used for example to implement distributed entanglement of qubits between remote quantum computers.

FIG. 4 illustrates an example of an apparatus for multiplexing qubit drive signals to an optical fiber for delivery to a cryogenic environment of a quantum computer. It is however noted that the example embodiments described with reference to FIG. 4 may be also applied without multiplexing of optical signals, e.g. for one modulated optical signal. In general, even though the apparatus 400 has been illustrated to comprise particular components, some of the components may not be present in every example embodiment. The apparatus 400 may also comprise components not illustrated in FIG. 4.

The apparatus 400 may receive, or comprise source(s) of, an input signal 402 or a plurality of input signals. An input signal may carry qubit driving information. The apparatus 400 may further receive, or comprise source(s) of, an optical signal (e.g. laser) 404 or a plurality of optical signals. A wavelength of an optical signal may be for example approximately 1550 nm. The input signal(s) may comprise RF signal(s), for example microwave signal(s). The apparatus 400 may be therefore applied to convert RF qubit drive signal(s) temporarily to the optical domain for delivery to the cryogenic environment, thereby improving quality of qubit driving.

The optical signal 404 may be modulated by the input signal 402, for example by an electro-optic-modulator (EOM) 406. An EOM 406 may be configured to cause an input signal dependent change to the optical signal 404 based on an electro-optic effect. For example, phase, frequency, amplitude, or polarization of the optical signal 404 may be altered according to the input signal. The example embodiments of the present disclosure may apply any suitable method for modulating an optical signal. The apparatus 400 may be configured to modulate a plurality of optical signals with respective input signals. Thereto, the apparatus 400 may comprise a plurality of the EOMs.

The apparatus 400 may further comprise an optical isolator 408, or a plurality of optical isolators, for respective optical signal(s). The optical isolator 408 may be located after the EOM 406 in the signal path towards the cryogenic environment. Hence, the optical isolator 408 may be located optically between the EOM 406 and the OMC 204. The optical isolator 408 may be configured to allow the modulated optical signal to pass from the EOM 406 towards the OMC 204. However, the optical isolator 408 may prevent, or at least substantially restrict, propagation of optical signals in the opposite direction, for example by dissipation of energy received from the cryogenic environment. Hence, the optical isolator 408 may prevent energy to be reflected back to the cryogenic environment, which reduces unnecessary heating at the cryogenic environment. A plurality of optical isolators may be optically coupled to a respective plurality of EOMs. Sources of the input signal(s) and optical signal(s), the EOM(s), and the optical isolator(s) may be located at the room temperature. It is however possible to operate the system without the optical isolator(s) 408, for example if the room temperature components terminate or otherwise dissipate the reverse signal well enough. This may be desirable for example to reduce cost. The apparatus 400 may further comprise a first MUX/DEMUX 410 (multiplexer/demultiplexer) and a second MUX/DEMUX 412. The first MUX/DEMUX 410 may be located at the room temperature and be configured to multiplex optical signals to an optical fiber 202. The second MUX/DEMUX 412 may be located at the cryogenic environment, for example at the temperature of approximately 10 mK, or more generally at a millikelvin stage of the cryogenic environment (e.g. temperatures ranging from 1 mK to 100 mK). This enables to reduce the number of optical fibers entering the lowest temperature region of the quantum computer, which in turn improves quality of qubit drive signals. Alternatively, the second MUX/DEMUX 412 may be located at the room temperature or at a higher temperature stage of the cryogenic environment.

The first MUX/DEMUX 410 and the second MUX/DEMUX 412 may for example apply wavelength division multiplexing (WDM), where multiple optical signals are translated to different wavelengths (frequencies) and conveyed top the cryogenic environment over a single optical fiber 202. Alternatively, or additionally, any suitable multiplexing method, such as for example spatial mode multiplexing or time-division multiplexing (TDM), could be used.

The first MUX/DEMUX 410 may enable bidirectional operation by acting as a multiplexer for the modulated optical signals propagating towards the cryogenic environment and as a demultiplexer for optical signals received from the cryogenic environment. The system may be alternatively configured as a unidirectional system, where the first MUX/DEMUX 410 operates as a multiplexer for the modulated optical signals propagating towards the cryogenic environment and not as a demultiplexer. Similarly, the second MUX/DEMUX 412 may enable bidirectional operation by acting as a demultiplexer for optical signals received from the first MUX/DEMUX 410 and as a demultiplexer for signals received from the OMC(s) located the cryogenic environment. If the system is configured as unidirectional, the second MUX/DEMUX 412 may operate as a demultiplexer for signals received from the first MUX/DEMUX 410.

An optical signal received from the room temperature over the optical fiber 202, optionally via the MUX/DEMUX 412, may be transduced to an RF signal by the OMC 204 for driving a qubit 416. The apparatus 400 may comprise a plurality of OMCs for a respective plurality of optical signals, received for example from the second MUX/DE-MUX 412.

The apparatus 400 may further comprise a coupling capacitance 414 optically between the OMC 204 and the qubit 416. The coupling capacitance 414 may introduce a weak coupling, where only a portion of the incoming power goes directly to the qubit 416 and most of it, for example much more than 99%, is reflected. This may be desirable, because when the qubits are operated as part of the computation, they may need to be decoupled from the driving environment such that they do not decay too quickly. This is also directly related to the need for driving qubits with relatively strong signals which are mostly just reflected from the qubit. This reflected power and the required power level result in the dissipation problem, which could be alleviated by bidirectional power conversion by the OMC 204 to enable moving the dissipation far from the qubit 416.

A plurality of the coupling capacitances 414 may be applied for a plurality of RF signals, received for example from the plurality of OMCs or from a plurality of qubits. In general, the apparatus 400 may comprise driving circuitry for driving the qubit 416 or a plurality of qubits. The driving circuitry may comprise electric conductors and other components, such as coupling capacitances 414, to enable delivery of the RF signal(s) from the OMC(s) to the qubit(s).

FIG. 5 illustrates an example of a method for driving qubits.

At 501, the method may comprise conveying at least one optical signal to a cryogenic environment of a quantum computer.

At 502, the method may comprise transducing the at least one optical signal to at least one radio frequency signal at the cryogenic environment of the quantum computer.

At 503, the method may comprise driving the at least one qubit based on the at least one radio frequency signal.

Further features of the method directly result for example from the functionalities and parameters of the apparatus 200, the quantum processing circuit 302, and/or the apparatus 400, as described in the appended claims and throughout the specification, and are therefore not repeated here. Different variations of the method may be also applied, as described in connection with the various example embodiments. An apparatus may be configured to perform or cause performance of any aspect of the methods described herein. Further, an apparatus may comprise means for performing any aspect of the method(s) described herein.

It is further noted that with the advancement of technology, the example embodiments of the present disclosure may be implemented in various ways. The present disclosure is therefore not limited to the particular examples described above. Instead, implementations may vary within the scope of the claims.

The invention claimed is:

1. An apparatus, comprising:
   at least one electro-optic modulator configured to modulate at least one optical signal with at least one input radio frequency signal at a non-cryogenic environment of a quantum computer;
   at least one optical fiber configured to convey the at least one optical signal to a cryogenic environment of the quantum computer;
   at least one optomechanical transducer configured to transduce the at least one optical signal to at least one radio frequency signal at the cryogenic environment of the quantum computer; and
   driving circuitry configured to drive at least one qubit of the quantum computer based on the at least one radio frequency signal.

2. The apparatus according to claim 1, further comprising:
   at least one optical isolator at the non-cryogenic environment of the quantum computer, wherein the at least one optical isolator is located optically between the at least one electro-optic modulator and the at least one optomechanical transducer, and wherein the at least one optical isolator is configured to dissipate energy received from the cryogenic environment.

3. The apparatus according to claim 1, wherein the at least one optical fiber is configured to convey a plurality of optical signals to the cryogenic environment of the quantum computer, the apparatus comprising:

a plurality of optomechanical transducers configured to transduce the plurality of optical signals to a plurality of radio frequency signals at the cryogenic environment of the quantum computer, wherein the driving circuitry is configured to drive a plurality of qubits based on the plurality of radio frequency signals.

4. The apparatus according to claim 3, further comprising:

a plurality of electro-optical modulators configured to modulate the plurality of optical signals with a plurality of input radio frequency signals at a non-cryogenic environment of the quantum computer.

5. The apparatus according to claim 3, further comprising:

a multiplexer configured to multiplex the plurality of optical signals to an optical fiber configured to convey the plurality of optical signals to the cryogenic environment of the quantum computer.

6. The apparatus according to claim 5, further comprising:

a demultiplexer configured to demultiplex the plurality of optical signals from the optical fiber at the cryogenic environment of the quantum computer.

7. The apparatus according to claim 6, wherein the multiplexer comprises a wavelength division multiplexer and/or wherein the demultiplexer comprises a wavelength division demultiplexer.

8. The apparatus according to claim 5, further comprising:

a plurality of optical isolators at a non-cryogenic environment of the quantum computer, wherein the plurality of optical isolators are located optically between the multiplexer and respective electro-optic modulators, and wherein the plurality of optical isolators are configured to dissipate energy received from the cryogenic environment via the optical fiber.

9. A method, comprising:

modulating at least one optical signal with at least one input radio frequency signal at a non-cryogenic environment of a quantum computer;

conveying the at least one optical signal to a cryogenic environment of the quantum computer;

transducing the at least one optical signal to at least one radio frequency signal at the cryogenic environment of the quantum computer; and driving at least one qubit based on the at least one radio frequency signal.

10. The method according to claim 9, further comprising:

transducing the at least one optical signal to the at least one radio frequency signal by at least one optomechanical transducer at the cryogenic environment of the quantum computer.

11. The method according to claim 9, further comprising:

modulating the at least one optical signal with the at least one input radio frequency signal by at least one electro-optic modulator.

12. The method according to claim 11, further comprising:

providing at least one optical isolator at the non-cryogenic environment of the quantum computer, wherein the at least one optical isolator is provided optically between the at least one electro-optic modulator and at least one optomechanical transducer for dissipating energy received from the cryogenic environment.

13. The method according to claim 9, further comprising:

conveying a plurality of optical signals to the cryogenic environment of the quantum computer;

transducing the plurality of optical signals to a plurality of radio frequency signals at the cryogenic environment of the quantum computer; and driving a plurality of qubits based on the plurality of radio frequency signals.

14. The method according to claim 13, further comprising:

modulating the plurality of optical signals with a plurality of input radio frequency signals at non-cryogenic environment of the quantum computer.

15. The method according to claim 13, further comprising:

multiplexing, by a multiplexer, the plurality of optical signals to an optical fiber configured to convey the plurality of optical signals to the cryogenic environment of the quantum computer.

16. The method according to claim 15, further comprising:

demultiplexing, by a demultiplexer, the plurality of optical signals from the optical fiber at the cryogenic environment of the quantum computer.

17. The method according to claim 16, wherein the multiplexer comprises a wavelength division multiplexer and/or wherein the demultiplexer comprises a wavelength division demultiplexer.

18. The method according to claim 15, further comprising:

providing a plurality of optical isolators at non-cryogenic environment of the quantum computer, wherein the plurality of optical isolators are provided optically between the multiplexer and respective electro-optic modulators for dissipating energy received from the cryogenic environment via the optical fiber.

\* \* \* \* \*